United States Patent [19]
Monett
[11] 3,810,234
[45] May 7, 1974

[54] DATA RECOVERY CIRCUIT

[75] Inventor: Michael Ross Monett, San Jose, Calif.
[73] Assignee: Memorex Corporation, Santa Clara, Calif.

[22] Filed: Aug. 21, 1972
[21] Appl. No.: 282,118

[52] U.S. Cl. .......... 340/174.1 A
[51] Int. Cl. .......... G11b 5/02
[58] Field of Search 340/174.1 G, 174.1 H, 174.1 A

[56] References Cited
UNITED STATES PATENTS

| | | | |
|---|---|---|---|
| 3,493,868 | 2/1970 | Hackett, Jr. | 340/174.1 H |
| 3,560,947 | 2/1971 | Franchini | 340/174.1 H |
| 3,688,211 | 8/1972 | Celaway | 340/174.1 H |
| 3,699,554 | 10/1972 | Jones | 340/174.1 H |
| 3,684,967 | 8/1972 | Kelly | 340/174.1 H |
| 3,689,903 | 9/1972 | Agrewelz | 340/174.1 H |

*Primary Examiner*—Vincent P. Canney
*Attorney, Agent, or Firm*—Limbach, Limbach & Sutton

[57] ABSTRACT

A data recovery system includes means for injection locking a variable frequency oscillator directly with raw data from a magnetic recording disc during the beginning of a read data operation in order to rapidly lock the variable frequency oscillator in phase with the incoming raw data signals. Desirably, the variable frequency oscillator includes an LC oscillator circuit, which provides excellent noise immunity.

21 Claims, 5 Drawing Figures

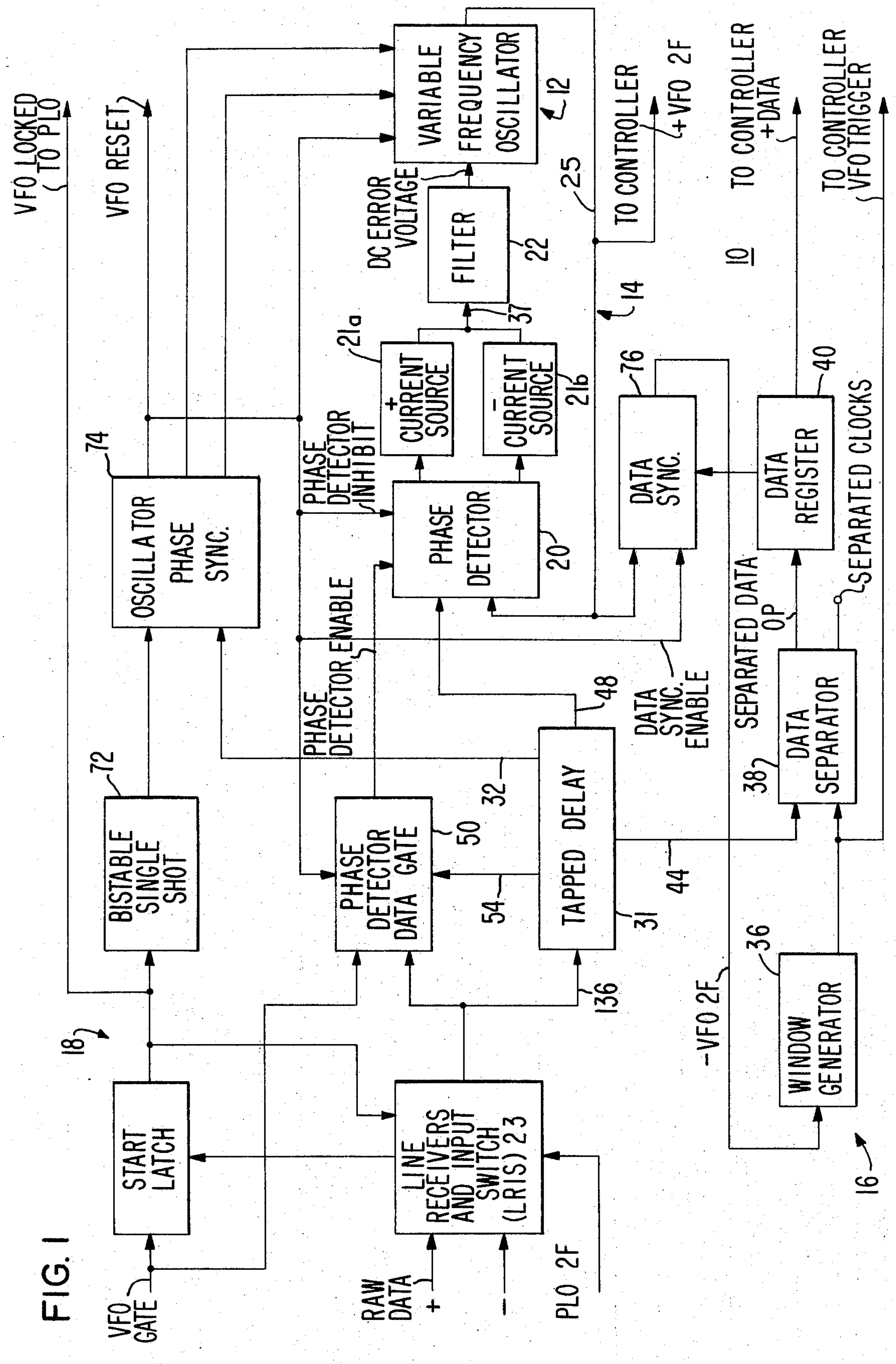
FIG. I

DATA RECOVERY CIRCUIT

BACKGROUND OF THE INVENTION

The present invention relates to magnetic disc recording, and more particularly, to the electronic circuitry for decoding data stored on the magnetic disc surface and for providing system timing signals.

Typical magnetic disc recording systems such as the IBM Model 3330 or the Memorex Model 3670 include a computer driven controller, a disc drive system, a plurality of magnetic recording discs, called a disc pack, and at least one magnetic disc surface having recorded thereon servo or timing signals.

Except during a "read" operation, the timing signals recorded on the servo disc surface are sensed, and a variable frequency oscillator (VFO) is phased-locked through appropriate means such as a phase lock oscillator circuit to the servo signals for supplying clock signals to the controller for write and space count operations. For more details of the operation of such a servo disc system, reference is made to U.S. Pat. No. 3,534,344 by George Santana.

The variable frequency oscillator is locked to the servo data by means of a phase-locked loop/oscillator (PLO). However, during a "read" operation, the VFO is disconnected from the PLO, and the variable frequency oscillator is locked directly to the raw data which is picked up by a magnetic recording head transducer from a selected magnetic recording disc surface.

By raw data, it is meant that the signals comprise both actual data information signals and, depending upon the particular type of recording code used, timing information signals as well. The nature, frequency, and number of data and timing signals depend upon the type of coding used in the system.

But, regardless of the type of code used in the system, it is the function of the VFO and related circuitry during a "read" operation to decode the incoming raw digital data by separating the data pulses from the clock pulses. Additionally, the separated data pulses can be relocated in time to remove the effects of bit shift and jitter before being passed to the controller.

A circuit for performing these functions is described in U.S. Pat. No. 3,614,635 to Anthony N. LaPine and Julian E. Vaughn. There, the variable frequency oscillator is made to decode the input data and individual incoming data pulses are relocated in time to correspond with the time slots defined by the oscillator output pulses. This is accomplished by a VFO feedback control loop containing a phase comparator and, in addition, a data standardizer. The phase comparator controls the frequency of the VFO and the data standardizer relocates the data pulses to the time slots of the oscillator.

Depending upon the sign and the magnitude of the phase difference between the output of the VFO and the incoming raw digital data signals, the phase comparator provides a current pulse of the proper polarity to the input of the VFO through a filter or integrator which corresponds to the time difference between the raw data pulse and the output of the VFO. The integrator produces a DC error voltage which is applied to a voltage controlled oscillator (VCO) for either increasing or decreasing the output frequency of the VFO.

Though minimized to a high degree, there always exists unavoidable misalignment between the servo disc surface and the servo disc transducer head. Consequently, when the VFO is disconnected from the PLO and the raw data from the disc park is provided to the VFO during a "read" operation, there will invariably be discrepancies between the phase of the PLO output and the raw data signals. A certain amount of time is required to lock the VFO to the raw data. The amount of time required is determined by the band-width of the VFO feedback control loop, which is largely a function of the time constant of the integrator or filter circuit.

During the transition of locking the VFO to the raw data signals, no data can be accurately read. That is, until the VFO is locked to the raw data signals, it is impossible to decode the data and clock signals. Therefore, it is imperative that this transition time be minimized and the VFO be rapidly locked to the raw data signals.

The usual approach to decrease this transition time is to alter the characteristics of the feedback control loop of the VFO so that the feedback loop itself operates to more quickly lock the VFO to the raw data signals, such as by increasing the band-width of the feedback loop during the switchover period. This can be accomplished, for example, by decreasing the time constant of the integrator or filter and by increasing the current to the current sources during this period.

This approach to minimizing the switchover time has several significant disadvantages. First, even with the increase in band-width, a comparatively long period of time is required to lock onto the raw data signals. Secondly, with an increase in band-width, there is also an increase in VFO phase jitter, which is undesirable during the actual "read" operations and which requires returning during the actual "read" operations and which requires returning to the normal mode. Third, phase offsets and jitter are introduced due to the increased currents in the phase detector and because of transients resulting from changing the integrator time constant. This can jeopardize correct data separation.

Prior art data decoding circuits utilize a ramp oscillator VFO. This type of oscillator typically includes a fixed capacitor and a charging current source. A threshold detector triggers, for example, a flyback transistor when the capacitor voltage reaches a predetermined value. The oscillator frequency is changed by the DC error voltage from the phase detector and filter (or integrator circuits which is the same thing) by modifying the capacitor charging rate through the variable current source.

This type of oscillator is often unstable in a high noise environment. A noise pulse created when the raw data pulse arrives may terminate the oscillator cycle at the wrong time by interfering with the operation of the threshold detector. This creates an instantaneous step change in the oscillator phase which produces a corresponding error in the data separation windows. The phase detector will tend to correct the oscillator phase, but a subsequent raw data pulse can throw the phase off in either direction depending upon the new phase relationship between the raw data and the oscillator pulse. This can lead to a limit-cycle oscillation in the feedback control loop, or otherwise reduce the ability of the circuit to correctly decode the incoming raw data.

Prior art phase comparator circuits used in data recovery systems, such as the phase comparator circuit described in U.S. Pat. No. 3,614,635 referred to above are not always satisfactory since a linear relationship between the phase difference and the output from the current sources is not maintained.

In particular, when there is a zero or low phase error, current pulses from a positive and a negative current source are summed to provide the input to the integrator. At larger errors, however, the current to the integrator is from either the positive or the negative current source, but not both. At the point where the current to the integrator is from only one of the current sources, and not the summed total of both the positive and negative current sources, a break in the circuit transfer function exists. This break introduces instabilities into the data recovery circuit, which can contribute to steady state error in the system.

The phase-locked loop can also enter a false lock condition where the VFO frequency does not equal the frequency of the incoming clock pulses. The frequency difference causes the phase detector to deliver alternately increasing, then decreasing current pulses into the filter, which integrates the pulses to produce an average DC error voltage sufficient to keep the loop in a stable lock. Once in this mode, the loop can never recover by itself.

There are several tradeoffs which have been made in loop and circuit design, such as providing a bleed resistor across the filter to return the DC error voltage to some nominal value when the circuit is not in use, or by adjusting the loop parameters to increase the chance that any false mode condition will occur inside the loop band-width limits so that loop dynamics will eventually result in capture to the correct mode. These tradeoffs do not necessarily guarantee capture, and they all result in performance degradation.

SUMMARY OF THE INVENTION

It is therefore an object of the present invention to provide an improved data decoding system. Another object of the invention is to provide circuitry to decrease the transition period wherein a magnetic disc file storage system is switched to a "read" operation.

Another object of the invention is to provide electric circuitry to decrease the time required to phase lock a variable frequency oscillator to a source of raw data pulse signals.

Another object of the invention is to provide novel apparatus to injection lock a variable frequency oscillator to the source of raw data pulse signals with switching means to minimize the introduction of transient signals. It is also an object of the invention to guarantee that the variable frequency oscillator feedback control loop will always bring the variable frequency oscillator to the correct operating frequency prior to a read operation.

In accordance with the present invention, means are provided for disconnecting the variable frequency oscillator feedback loop when it is desired to read-out data from a magnetic recording disc, and to provide the raw data directly to the variable frequency oscillator, e.g. to injection lock the oscillator. Thus, the feedback loop circuit, including the phase comparator, current source and integrator or filter are entirely bypassed during the switchover period.

When the VFO is injection locked directly to the incoming digital data signals, the VFO no longer remains a free-running oscillator; rather, in effect, it becomes a ringing amplifier. Once the variable frequency oscillator is "locked" to the raw digital data, the feedback control loop is re-established and the raw data is no longer fed directly to the VFO.

With the use of the present invention, the time required to switch the VFO between the PLO and the raw data signals from the disc pack is reduced considerably. The phase error (offset) caused by increasing the current to the current sources is eliminated because, a fortiori, the current is not increased. A novel switching scheme is utilized so that transients are minimized during switching from the injection locking mode to the normal opening mode.

In accordance with the present invention, an improved oscillator design is utilized in the data decoding circuits of the present invention. In particular, an LC-type oscillator replaces the usual ramp-type oscillator.

There are many advantages of the LC-type oscillator in a data recovery circuit. First, an LC oscillator provides excellent stability when used in a high-noise environment, such as in data decoding applications. The energy associated with the oscillations in an LC circuit provide a "flywheel" effect which tends to maintain the VFO running in the phase which existed during the previous cycles, despite small perturbations caused by transient noise.

Secondly, an LC oscillator lends itself to a simpler design in order to control the output frequency of the VFO. Thus, voltage control of the frequency can be accomplished by a simple voltage-variable capacitor (varicap) instead of by complicated variable current sources that are required with ramp-type oscillators. Further, since the varicap is operated as a reverse-biased diode, the leakage current is extremely low. This helps to eliminate phase errors with unavoidable changes in operating frequency.

Finally, LC oscillators are capable of performing at much higher frequencies than the conventional ramp oscillator, a very desirable feature in future data storage systems.

In accordance with another aspect of the present invention, an improved phase comparator circuit is provided wherein there is always a linear relationship between the phase error and the current to the integrator or filter. This is accomplished by insuring that both the positive and negative current sources are triggered on during each cycle whether there is zero, small or large phase differences. In particular, each current source is turned on at least for a minimum, fixed period of time by the use of a fixed delay in the reset of the positive and negative current latches.

The phase detector of the present invention operates by comparing the time difference between two positive-going transitions. Hence, unlike prior art comparators, the output is independent of the frequency of the variable frequency oscillator. Thus, small variations in frequency caused by disc speed variations do not change the phase reference of the VFO, and the incoming raw data pulses remain centered in the data separation windows.

In accordance with another aspect of the invention, the VFO phase lock loop is designed to have a narrow band-width, which enhances data recovery. The improved circuit design insures that the VFO locks to the correct frequency, even with the narrow band-width of the loop.

BRIEF DESCRIPTION OF THE DRAWINGS

FIG. 1 is a block schematic diagram of a data recovery circuit incorporating the present invention.

DESCRIPTION OF THE PREFERRED EMBODIMENT

Figure 2A:
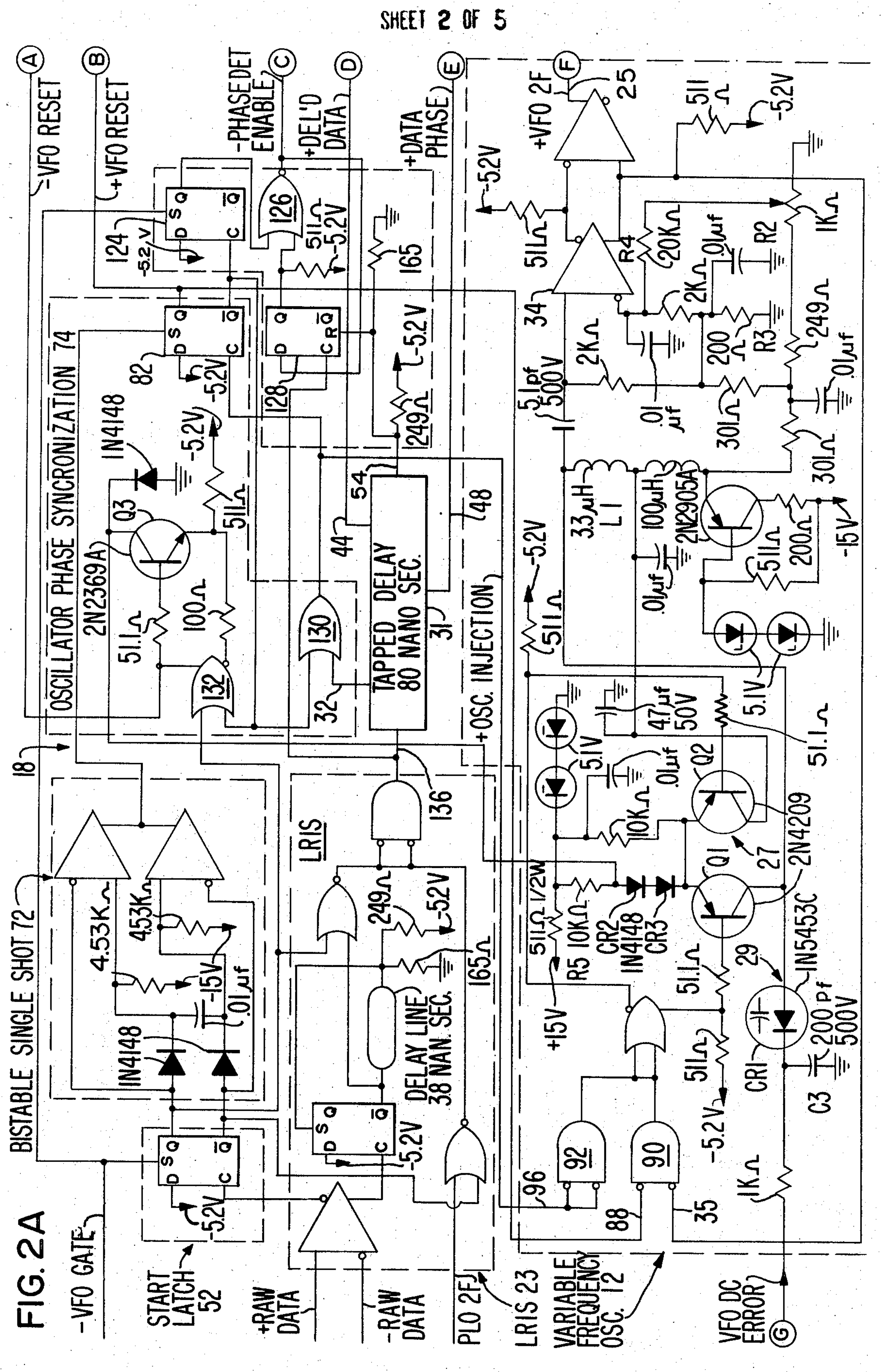
FIGS. 2A and 2B are detailed schematic diagrams of the circuit of FIG. 1.
Figure 2B:
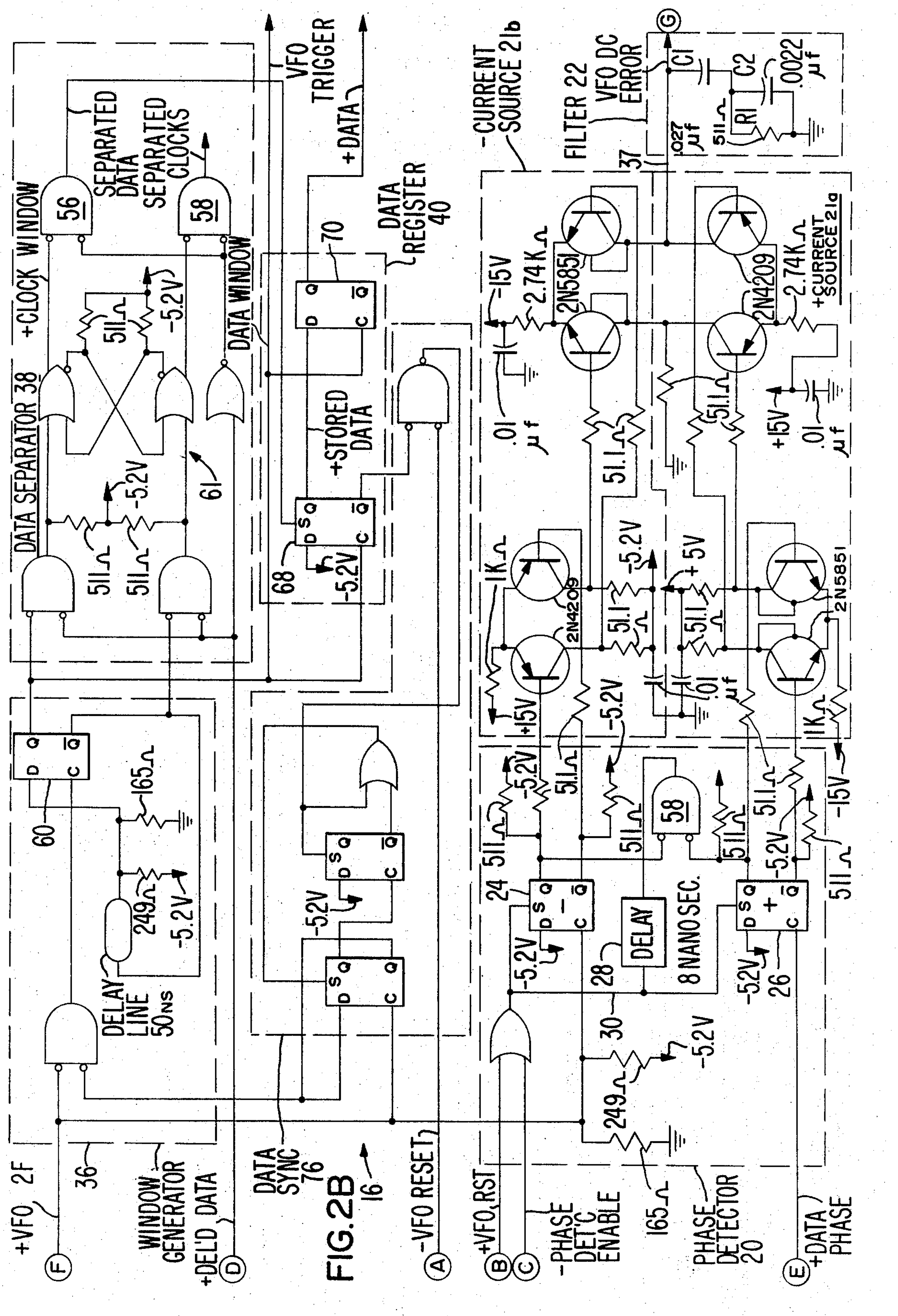

The operation of the present invention will now be described in greater detail. Reference is made, in particular, to FIG. 1, which is a block diagram illustrating the overall operation of one embodiment of a data recovery circuit 10 of a magnetic disc storage system incorporating the present invention. Reference is additionally made to FIGS. 2A and 2B which are detailed schematic diagrams of the circuit of FIG. 1. Additionally, reference should be made to FIG. 3 which graphically illustrates important signal waveforms and their timing sequence during the operation of the circuit of FIGS. 1 and 2A and 2B.

Data recovery circuit 10 consists of several subcircuits including a variable frequency oscillator (VFO) 12, a VFO feedback control loop 14, data separation circuit 16, and start logic circuitry 18.

The output frequency of the VFO is made to be twice that of the incoming raw data signals. Hence the output from the VFO is referred to as VFO 2F. See FIG. 3C. The purpose of the VFO 12 and the feedback control loop 14 is to center the incoming raw data pulses from the magnetic disc track in appropriate separation "windows". By providing "windows", it is then possible to determine whether an incoming raw data signal is a data or a clock pulse. That is, if a pulse occurs during a data window, then the system accordingly decodes the pulse as a data pulse. Similarly, if a pulse occurs during a clock window, the system accordingly decodes the pulse as a clock pulse.

Since, for various reasons, signals from the magnetic disc track are subject to jitter and other time and phase relocations, it is desirable to provide a window which is "centered" relative to incoming raw data signals. By centering it, it is meant that the middle of the window occurs at the same point in time as the occurrence as an "average" raw data signal. By centering, the possibility of an error in data separation is minimized.

The feedback control loop 14 consists of a phase detector 20, current sources 21*a* and 21*b*, and filter or integrator 22. The purpose of the feedback control loop is to maintain the VFO locked to the raw data signals during a read operation and, during write and space count operations, to signals derived from a servo disc as explained earlier. The latter signal is referred to in FIGS. 1 and 2 as PLO 2F, which also has a frequency of twice that of the raw data signals. The usual practice to obtain the PLO 2F signal is to provide a phase-locked oscillator of any suitable type which is driven by the pre-recorded servo disc information.

Both the PLO 2F and the raw data signals are provided to a line receiver and input switch (LRIS) 23. This circuit is responsible for switching between the PLO 2F and raw data signals.

In order to lock VFO 12 to the incoming raw data or PLO 2F signals the phase detector 20 provides either a plus or minus signal to the appropriate current source 21a and 21b which delivers a current pulse to the filter 22, with its polarity and duration determined by the time difference between the incoming raw data or PLO 2F signal and the VFO 12 output signals, VFO 2F, which is provided via line 25.

Filter 22 produces a DC error voltage (FIG. 3*j*) which corresponds to the average value of the error samples. A change in the average error changes the frequency of VFO 12 in a direction needed to correct any VFO 12 error. A change in the VFO output frequency in turn produces a gradual change and the feedback loop 14 eventually settles on the condition that minimizes the average phase error. When the phase error is reduced to zero, the time difference between the incoming raw data or PLO 2F signals and the VFO output signal is reduced to zero. See FIGS. 3*a*(1) and (4) and 3*d*.

The basic configuration of the phase detector 20 includes two D-type flip-flops 24 and 26 with feedback to restore both to the initial state after both have been clocked. A delay 28 in the feedback path 30 establishes the minimum time that either flip-flop is in the clocked state, thus establishing a minimum time that current sources 21*a* and 21*b* are switched on. Delay 28 is selected to insure that both current sources 21*a* and 21*b* are first turned fully on before they are turned off. This feature is necessary to eliminate dead-band whereby the phase detector 20 does not respond properly to small phase errors (or time differences) between the two input signals to the phase detector 20.

As explained, the output of current sources 21*a* and 21*b* is a current pulse of a predetermined magnitude and width corresponding to the time difference between the two input signals. See FIGS. 3*g*, 3*h* and 3*i*. The polarity of the current pulse is determined by the arrival time of the raw data pulse with respect to the positive-going transition of the VFO 2F signal. Additionally, see FIGS 3a and 3c under conditions (2) and (3). If the raw data pulse arrives first, condition (3) a positive current pulse is provided. If the raw data pulse arrives later, condition (2) a negative current pulse is provided.

Current pulses to the filter 22 are integrated to produce a DC error voltage which is applied to the variable frequency oscillator 12 (see FIG. 3*j*). The filter time constants, determined by circuit components C1, C2 and R1 are chosen to provide optimum phase tracking in the presence of random bit shift and jitter in the incoming raw data signals.

Details of VFO 12 are shown in FIG. 2A. The elements C3, voltage-variable capacitor (varicap) CR1, and L1 comprise a parallel-resonant LC circuit 29 which is driven by a switchable current source 27 consisting of transistors Q1 and Q2. The current source 27 is driven by either of two input signals; either output 32 of tapped delay line 31, or by an internal feedback signal on line 35 obtained from a limiter 34 which is driven by a portion of the signal developed across the resonant LC circuit 29. As a ringing amplifier, the input pulses to the oscillator 12 excite the damped LC circuit 29 which produces a sinusoidal waveform at resonance. As an oscillator, the output of limiter 34 is returned to switchable current source 27 with the polarity needed to sustain oscillations. The sinusoid is converted into a square wave in the limiter 34 which is the VFO 2F signal.

Thus, variable frequency oscillator 12 can be connected either as a self-controlled free-running oscillator while frequency is determined by resonant LC circuit 29, or it may be connected as a ringing amplifier to deliver suitably delayed raw data pulses directly to the LC circuit 29 as will be explained in greater detail subsequently.

When the variable frequency oscillator 12 is connected as an oscillator during the normal steady state operation, frequency control is accomplished by means of the varicap, CR1, which changes the resonant frequency according to the DC error voltage from filter 22. A small amount of DC offset voltage may be applied to the limiter 34 by means of resistors R2, R3 and R4 which can be used to adjust the asymmetry of the VFO 2F square wave over a limited range. This feature is used in conjunction with the tap 44 of delay line 31 to exactly center the raw data pulses in their respective windows.

The operation of phase detector 20 to center clock and data pulses within their respective windows will now be explained. For a proper understanding of this operation, particular reference is made to FIG. 3. Note that the waveforms shown in FIG. *3b* and *3f* are actually combined in the phase detector, but are shown separately here for clarity.

When VFO 12 is locked to the servo disc, which is always the case except during a read data operation, the PLO 2F signal derived from a phase lock loop circuit (not shown) and driven by the servo disc timing signals is fed directly to the VFO phase detector 20 through tap 48 of delay line 31. The phase detector data gate 50 is continually disabled allowing the phase detector to operate continually. The phase detector data gate 50 is inhibited by a signal, VFO gate (FIG. 4a), from disc drive controller (not shown).

When the VFO 12 is locked to read data, the data gate 50 operates to inhibit the phase detector 20 during the interval between raw data pulses. The purpose of inhibiting the phase detector 20 between raw data pulses is to prevent a false output from the phase detector 20 during the interval between raw data pulses.

Phase detector data gate 50 is connected to tap 54 of tapped delay line 31. This delay permits the detector data gate 50 to provide a phase detector enable pulse (FIG. *3b*) to the phase detector 20 which is approximately centered over the leading edge of raw data pulse provided from tap 48 to phase detector 20 (FIGS. *3a* and *3b*). The enable pulse allows the phase detector to compare the time difference between the two input signals.

Figure 3:
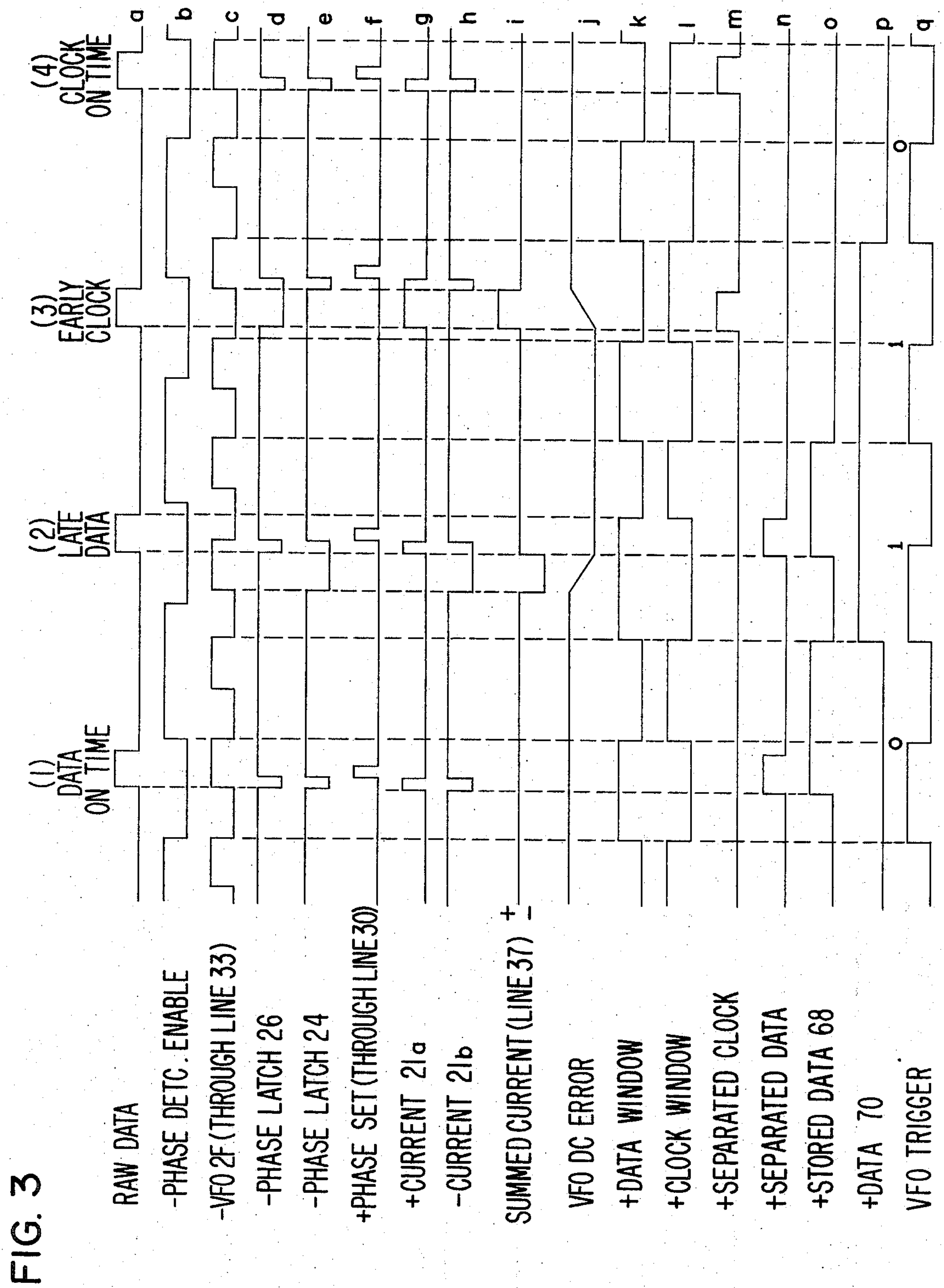
FIGS. 3 and 4 are graphical illustrations of various signal waveforms generated during the operation of the circuit of FIGS. 1, 2A and 2B and of the timing relationships between them.

When the raw data pulse arrives on time, FIG. 3, conditions (1) and (4), both latches are clocked simultaneously, turning on both current sources 21*a* and 21*b* simultaneously, whereupon the NAND-gate 58 applies a set pulse to the 8 ns delay line 28. When the pulse passes through the delay line 28, it restores both latches 24 and 26 to the initial state simultaneously, which also simultaneously turns off both the current sources. The net result is that there is no current into filter 22 and hence no change in the DC error voltage.

In the case of a late data pulse, FIG. 3, condition (2), the positive transition of the VFO 2F clocks the −phase latch 24 and turns on the −current source 21*b*. When a late data pulse arrives at the phase detector 20, condition (2), the (+) phase latch 26 is clocked, turning on the (+) current source 21a and terminating the current pulse (FIG. 3i) into the filter 22. At this point, the phase detector restore NAND-gate 58 finds that both the (+) phase latch 26 and the (−) phase latch 24 have been clocked and supplies a set pulse (FIG. 3f) to the 8ns delay line 28. This restores both latches 24 and 26 to the "set" state and turns both current sources 21*a* and 21*b* off.

The signals from the current sources 21*a* and 21*b* (FIGS. *3g* and *3h*) are summed at 37 prior to the filter 22. The summed current waveform is shown in FIG. *3i*. The net current from current sources 21*a* and 21*b* into the filter 22 through line 37 is a pulse whose width is equal to the time difference between the positive transitions of the VFO 2F signal and the late data pulse. See FIG. *3i*. The change in the DC error voltage (FIG. *3j*) is of the direction necessary to reduce the frequency of the VFO 12.

The same process is repeated for an early pulse, condition (3) in FIG. 3. However, since the clock pulse arrives sooner than the corresponding positive transition of the VFO 2F signal, the net current into the filter is a pulse whose width is equal to the time difference between the positive transitions of the VFO 2F signal and the early clock pulse, but the polarity of the current is opposite to that produced by a late pulse. The change in the DC error voltage is in the direction necessary to increase the frequency of the variable frequency oscillator 12.

The data separation circuit 16 decodes the incoming digital information by separating the data pulses from the clock pulses. The data separation circuit 16 includes a window generator 36, a data separator circuit 38 and a data register 40. Window generator 36, comprising a binary trigger 60 is clocked on each negative transition of the (+) VFO 2F signal to provide the VFO trigger signal. See FIGS. *3c* and *3q*.

The output of the window generator 36 is a square wave centered on the (+) VFO 2F transition. One polarity of the square wave is arbitrarily assigned as the data window; the other becomes the clock window (FIGS. *3c*, *3k* and *3l*).

The data separator 38 includes a latch circuit 61. Its purpose is to prevent the data or clock window from changing state while a raw data pulse is present at the data separator 38. This prevents the trailing edge of a late pulse from appearing in the adjoining window. See FIGS. *3k*, *3l*, condition (2).

Depending upon the state of the window, the raw data pulse is allowed to pass through either gate 56 and 58. Thus, a raw data pulse appearing in the data window will appear at the separated data output (FIG. 3*n*), while a raw data pulse appearing in the clock window will appear at the separated clock output (FIG. 3*m*).

The separated clock pulses are not used in the present invention. The separated data pulses are applied to data register 40 which comprises a two-stage shift register which is clocked at the transition from a clock window to a data window. The first stage 68 stores the separated data pulse until the next transition from a clock to data window, whereupon the separated data pulse is transferred to the second stage 70 in the normal action of a shift register. Since the separated data pulse terminates before this transition, the first stage 68 of the shift register returns to its original state.

The output of the data register 40 is a series of pulses corresponding to the sequence of data pulses in the raw data, but with bit shift and jitter removed. See FIG. 3*p*. Since the data output can only change state at times determined by the variable frequency oscillator 12, the decoded output is said tobe standardized.

The start logic circuitry 18 consists of a start latch 52, a bistable single shot 72, an oscillator phase synchronization circuit 74, and a data synchronization circuit 76. The purpose of the start logic circuitry 18 is to control the sequence of operations which synchronize or lock the VFO 12 to the raw data during the beginning of a read operation, and re-synchronize the VFO to the PLO (not shown) at the completion of the read operation. In particular, the start logic circuitry 18 is utilized to provide injection-locking of the VFO 12 during the initial transition to a read data sequence.

The utilization of injection locking is part of the general process of synchronization. Synchronization is used herein to refer to locking the VFO 12 and the entire data separation circuit 16 to the incoming raw data signals.

The object of synchronization at the beginning of a read operation is threefold:

First, while the VFO 12 is locked to the servo disc, the phase detector 20 is allowed to operate continuously; that is, the phase detector data gate 50 is held inoperative. During the synchronizing interval while the VFO 12 is being locked to raw data, the phase detector 20 is inhibited by oscillator sync latch 74 to prevent the generation of unwanted current pulses to the filter 22 which may change the otherwise correct DC error voltage. This effectively disconnects the feedback control loop 14 during this period of time. At the end of the synchronizing interval, the phase detector 20 is allowed to operate by means of the phase detector data gate 50.

Second, due to the random phase difference which may exist between the phase of the variable frequency oscillator 12 and the phase of incoming raw data pulses, it is necessary to synchronize the oscillator 12 to the phase of the raw data pulses. This is accomplished by breaking or opening the oscillator feedback loop 14 for a sufficient length of time to allow the original oscillations to decay and at the same time directly injecting properly-timed raw data pulses into the oscillator 12 current switch 27. It is to be noted that the feedback line 35 is internal to the VFO 12 and is not to be confused with the VFO feedback control loop 14 which is external to the VFO 12.

Since the DC error voltage stored in the filter 22 is the correct value required to tune the variable frequency oscillator 12 to the disc speed (by virtue of the action of the PLO), the LC circuit 29 in the VFO 12 is tuned to resonance with the injected raw data pulses. After a sufficient lapse of time, the oscillations produced in the LC circuit 29 bear a fixed relationship to the phase of the injected raw data pulses from tap 32 of delay line 31 and the object of synchronizing the oscillator to the incoming raw data is accomplished.

Since the oscillator normally operates at twice the frequency of the incoming raw data, the amplitude of the oscillation produced during injection locking would normally be one-half the amplitude maintained while the oscillator line 35 is closed. In order to minimize the time required by the oscillator 12 to stabilize to the proper amplitude, the amount of current delivered to the oscillator current switch 27 during injection locking is doubled by means of elements R5, CR2, CR3 and transistor Q3.

Third, the VFO 12 is always constrained to begin synchronization to read data in an area on the disc track where it is known that clock pulses have been prerecorded. Thus, if during synchronization the data and clock windows happen to become inverted (that is, interchanged), a known clock pulse will be separated into the separated data output and be stored in the first stage 68 of the 2-stage shift register comprising data register 40.

When this occurs, the data synchronizing circuit 76 operates to invert the data and clock windows by deleting one transition of the VPO 2F signal while the window generator is generating a clock window. The timing is arranged so that when the window generator begins operating again, it will correctly decode the incoming raw data pulses into the clock window.

This operation will repeat as long as the VFO is being synchronized since the process of synchronization may cause the windows to become inverted more than once.

Figure 4:
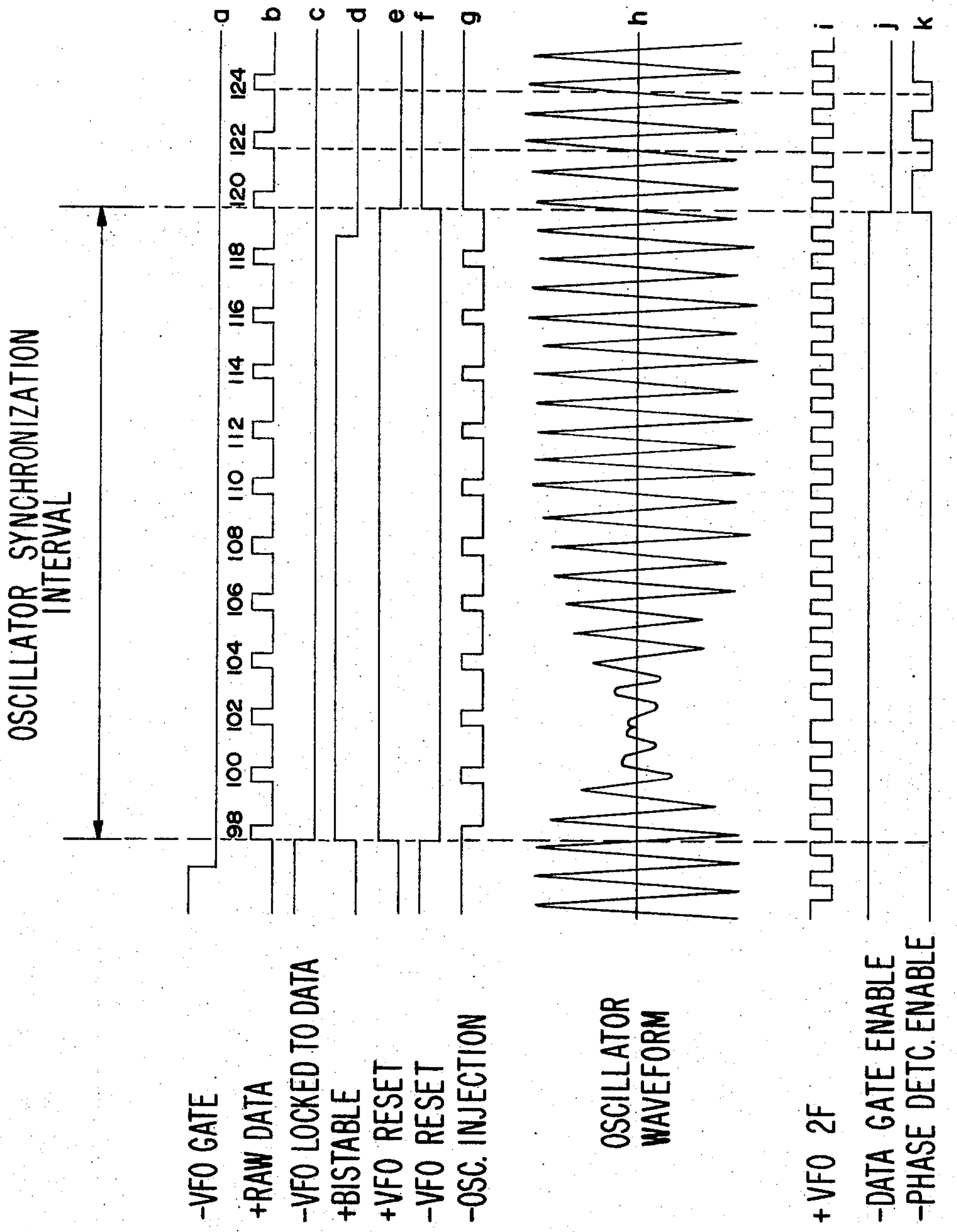

In addition, reference is made to FIG. 4 during the following sequence of events at the beginning of a read operation. During synchronization, it is not possible to illustrate all of the possible waveforms that may be observed due to the random nature of the initial phase error between the VFO and the incoming raw data. In any event, a description of all of these possible waveforms is not required for an understanding of the present invention. An initial phase error approaching 180 degrees has been selected to illustrate the process of injection-locking. While different initial errors may produce significantly different waveforms, the end result is the same; namely, that the oscillator 12 phase is quickly brought into a predetermined phase relationship with that of the incoming raw data, and the oscillator 12 amplitude quickly reaches the normal value.

Initially, the VFO 12 is phase-locked to the PLO 2F signal as previously explained. The charge stored in capacitor C1 in the filter 22 is inherently of the correct value to maintain the VFO 12 frequency correlated with the disc speed, which permits the oscillator LC circuit 29 to resonate with the incoming raw data pulses.

At the beginning of a read sequence, when it is necessary to lock the VFO 12 to the raw data, the controller changes the VFO gate signal to a logic zero level. See FIG. 4a. This releases the start latch 52 and allows it to respond to the next raw data pulse from the LRIS 23. This is done to prevent initiation of the synchronizing interval during a disc defect when no raw data pulses are available for synchronization.

The first raw data pulse clocks the start latch 52 which triggers the bistable single shot 72 and switches the LRIS 23 to allow the raw data pulses (FIG. 4*b*) to pass to the tapped delay line 31 instead of the PLO 2F pulse signals.

The output of the bistable single shot 72 (FIG. 4*f*) is applied to the set input of the oscillator sync latch 82 of oscillator phase sync circuit 74. This operates to inhibit the phase detector 20 by means of the (+) VFO reset signal (FIG. 4e) and switches the variable frequency oscillator 12 to the injection-locked or synchronization mode. This is done by simultaneously (1) breaking the VFO 12 feedback line 35 by means of a logic one level applied to input 88 of gate 90, (2) by allowing resistor R5 to supply more current to the oscillator current switch 27 by cutting off transistor Q3, and (3) by enabling gate 92 to apply raw data pulses from tap 32 of delay line 31 to the oscillator injection-locking input 96. Also, the data sync circuit 76 is allowed to function by means of the −VFO reset signal (FIG. 4*f*).

With the feedback loop broken and no other input to the LC circuit 29, the energy contained in the LC circuit 29 would naturally decay due to losses inherent in any practical LC circuit. In the example chosen, this process is aided by the phase of the first three raw data pulses 98, 100 and 102 (FIG. 4*b*) which occur out of phase with the oscillation prior to the beginning of the read operation. See FIG. 4h. This quickly reduces the amplitude of oscillation to near-zero, and accomplishes the necessary phase reversal. See FIG. 4*e*. Pulses 104, 106, 108, 110 and 112 reinforce the amplitude of the oscillation and bring it to the normal steady state value. During the synchronization interval, the data sync circuit 76 operates to invert the data/clock window until the incoming raw data pulses are decoded as clock pulses as previously explained.

After a predetermined interval set by the bistable single shot 72 (FIG. 4*d*), the oscillator sync latch 82 of the oscillator phase sync circuit 74 is released and allowed to clock on the next raw data pulse 120 from tap 32 of the delay line 31. When this happens, the signal on line 35 from the limiter 34 in the variable frequency oscillator 12 is in phase with the incoming raw data pulse at tap 32. Hence the signals in lines 35 and 96 are in phase with one another at this instant. This permits switching the oscillator 12 from the injection-locking signal on line 96 to its own internal signal on line 35 without disrupting the phase or amplitude of the oscillations which have built up in the LC circuit 29.

In particular, when the oscillator sync latch 82 is clocked by a subsequent raw data pulse 120, the following operations are performed:

1. A logic zero level signal, +VFO reset, (FIG. 4*e*), is applied from "Q" of latch 82 to the oscillator feedback gate 90 which restores the variable frequency oscillator internal feedback signal, VFO 2F on line 35 (FIG. 4*i*) from limiter 34.
2. This same logic zero level signal, +VFO reset, is applied to the phase detector 20 to allow it to respond to the enable pulse from the phase detector data gate.
3. A logic one level signal, −VFO reset, (FIG. 4*f*) from Q of latch 82, is applied to the phase detector data gate latch 124 which is thereby clocked. The Q output of latch 124 applies a logic zero level signal, −data gate enable (FIG. 4*j*) to gate 126 of the phase detector data gate 50. This gate responds by applying a logic one level signal, phase detector enable (FIG. 4*k*) to the phase detector 20 to keep it inhibited, and to the data gate latch 128 which prepares the phase detector data gate 50 to begin operating on the next raw data pulse.
4. The logic one level signal, −VFO reset (FIG. 4*f*) from the oscillator sync latch 82 is applied to gate 130 which in turn applies a logic one level signal (FIG. 4*g*) to the variable frequency oscillator injection locking input gate 92 and to the clock input of the oscillator sync latch 82. This terminates the injection locking pulses to the variable frequency oscillator 12.
5. The logic one level from Q of the oscillator sync latch 82 (FIG. 4*f*) is applied to gate 132 turning on transistor Q3. This shunts the extra current supplied by resistor R5 to ground and restores the current supplied to the oscillator switch 27 to the normal value.
6. The logic one voltage from the oscillator sync latch 82 (FIG. 4*f*) is applied through gate 132 to the data sync circuit 76, and terminates the operation of the data sync circuit 76.

The timing relationship between various signals in the system is controlled by selecting appropriate tap positions on delay line 31. Referring particularly to FIG. 2A, the input 136 to output 54 of the tapped delay line, a fixed delay of approximately 80 nanoseconds (ns), is provided which is nearly equal to the period of the VFO 2F oscillator signal. These two signals control the phase detector gate 50 as explained previously.

Tap output 48 is located at approximately 40 nanoseconds or halfway down the delay line 31. This tap drives the phase detector 20 which provides the centering action to keep the incoming raw data pulses centered in the data separation windows, and is chosen in conjunction with the output of the phase detector data gate 50 to ensure correct output from the phase detector 20 for pulses greatly displaced from their true positions.

Tap output 32 is located slightly ahead of tap 48 and is used to injection-lock the oscillator 12 to the phase of the incoming raw data pulses. The amount of advance is selected so as to be equal to the propagation delay through the oscillator phase synchronization circuit 74 so that when the oscillator 12 is switched from the injection lock made to the normal mode, the time difference between the VFO 2F signal and the leading edge of the raw data signal at tap output 48 is as close to zero as possible.

Tap output 44 is slightly delayed from tap 48 to account for propagation delays through the data sync circuit 76 and window generator 36. By virtue of the action of the phase-locked loop to align the positive transition of the VFO 2F signal with the average phase of the incoming raw data signals, the signal on tap 44 is properly centered in the separation windows.

I claim:

1. A circuit for decoding stored data information signals, said data information signlals including data signals and clocking signals, utilizing a plurality of magnetic recording discs as the storage medium, and including at least one magnetic disc surface having servo information signals recorded thereon, comprising:

a. a variable frequency oscillator for providing system timing signals;

b. a feedback control system for receiving input signals to said variable frequency oscillator and for controlling the output frequency of said variable frequency oscillator;

c. means for locking said variable frequency oscillator to said servo information signals;

d. means for disconnecting said feedback control system from said servo information signals when it is desired to read out stored data information signals from said plurality of magnetic discs;

e. means for injecting said variable frequency oscillator directly with said data information signals during the transition of locking said variable frequency oscillator to said data information signals; and f. means for re-connecting said variable frequency feedback control loop after the output of said variable frequency oscillator is in phase, within predetermined limits, with said stored data signals, said variable frequency oscillator thereafter being locked to said stored data information signals for separating said data signals and clocking signals, and for providing system timing signals.

2. A data decoding circuit as in claim 1 wherein said feedback system includes positive and negative current sources, a phase detector for comparing the phase relationship between the variable frequency oscillator and incoming data information signals and including means for switching on said positive and negative current sources, means for summing the outputs of said positive and negative current sources, a filter connected between said summed output and said variable frequency oscillator, and including means for switching both said positive and negative current sources on for a minimum fixed period of time during each phase comparison cycle.

3. A data decoding circuit as in claim 2 wherein said switching means comprises a first latch for activating said positive current source in response to a data information signal and a second latch for activating said negative current source in response to a variable frequency oscillator pulse, and means for resetting said first and second latches to thereby de-activate said current sources a predetermined period of time after both said positive and negative current sources have been activated.

4. A data decoding circuit as in claim 3 wherein said first and second latches are activated by the leading edges of said data information signals and said variable frequency oscillator pulses respectively.

5. A data decoding circuit as in claim 4 wherein said first and second latches remain activated, despite subsequent data information and variable frequency oscillator pulses, respectively, unless the same are deactivated prior to such subsequent data information and variable frequency oscillator pulses.

6. A data decoding circuit as in claim 2 including means for inhibiting said phase detector during the intervals between data information signals.

7. A data decoding circuit as in claim 4 including means for inhibiting said phase detector during the intervals between data information signals.

8. A data decoding circuit as in claim 7 wherein said variable frequency oscillator comprises an LC oscillator circuit.

9. A data decoding circuit as in claim 8 wherein said means for disconnecting said feedback control system and injecting said variable frequency oscillator directly with said data information signals includes means for operating said LC oscillator circuit as a ringing amplifier.

10. A data decoding circuit as in claim 1 wherein said variable frequency oscillator comprises an LC oscillator circuit.

11. A data decoding circuit as in claim 10 wherein said means for disconnecting said feedback control system and injecting said variable frequency oscillator directly with said data information signals includes means for operating said LC oscillator circuit as a ringing amplifier.

12. In a data recovery system including a variable frequency oscillator and a variable frequency oscillator feedback control loop therefore which receives the variable frequency oscillator input signals, improved means for locking said variable frequency oscillator to a stream of stored data signals comprising data and clocking bits, where said variable frequency oscillator has previously been locked to a reference signal source whose frequency is related to the speed of said data stream comprising:

a. means for disconnecting said feedback control loop from said variable frequency oscillator;

b. means for injecting the stored data signals directly to the input of said variable frequency oscillator; and c. means for re-connecting said variable frequency feedback control loop after the outputs of the variable frequency oscillator is in phase, within predetermined limits, with said stored data signals.

13. A data recovery system as in claim 12 wherein said variable frequency oscillator comprises an LC oscillator circuit.

14. A data recocery system as in claim 13 wherein said means for providing said stored data directly to the input of said variable frequency oscillator includes means for operating said LC oscillator circuit as a ringing amplifier.

15. A circuit for decoding stored data information signals, said data information signals including data signals and clocking signals, utilizing a plurality of magnetic recording discs as the storage medium, and means for providing a reference signal source related to the speed of said magnetic discs, comprising:

a. a variable frequency oscillator for providing system timing signals;

b. a feedback control system for receiving input signals to said variable frequency oscillator and for controlling the output frequency of said variable frequency oscillator;

c. means for locking said variable frequency oscillator to said data information signals when it is desired to read-out said data information signals from said plurality of magnetic recording discs, and at all other times locking said oscillator to said reference signal source means, and d. wherein said variable frequency oscillator comprises an LC oscillator circuit.

16. A circuit for decoding stored data signals comprising:

a. a variable frequency oscillator for providing system timing signals;

b. a feedback control system for receiving input signals to said variable frequency oscillator and for controlling the output frequency of said variable frequency oscillator, wherein said feedback control system includes i. positive and negative current sources, ii. a phase detector for comparing the phase relationships between the variable frequency oscillator and incoming data signals and including means for switching on said positive and negative current sources, iii. means for summing the outputs of said positive and negative current sources, and iv. a filter connected between said summed output and said variable frequency oscillator; and c. means for switching both said positive and negative current sources on for a minimum fixed period of time during each phase comparison cycle.

17. A data decoding circuit as in claim 16 wherein said switching means comprises a first latch for activating said positive current source in response to a data information signal and a second latch for activating said negative current source in response to a variable frequency oscillator pulse, and means for resetting said first and second latches to thereby de-activate said current sources a predetermined period of time after both said positive and negative current sources have been activated.

18. A data decoding circuit as in claim 17 wherein said first and second latches are activated by the leading edges of said data information signals and said variable frequency oscillator pulses respectively.

19. A data decoding circuit as in claim 18 wherein said first and second latches remain activated, despite subsequent data information and variable frequency oscillator pulses, respectively, unless the same are deactivated prior to such subsequent data information and variable frequency oscillator pulses.

20. A data decoding circuit as in claim 18 including means for inhibiting said phase detector during the intervals between data information signals.

21. A data decoding circuit as in claim 16 including means for inhibiting said phase detector during the intervals between data information signals.

* * * * *